R. J. McCOMB.
MANUFACTURE OF SPLICE BARS FOR RAIL JOINTS.
APPLICATION FILED DEC. 16, 1920.
1,373,749.
Patented Apr. 5, 1921.
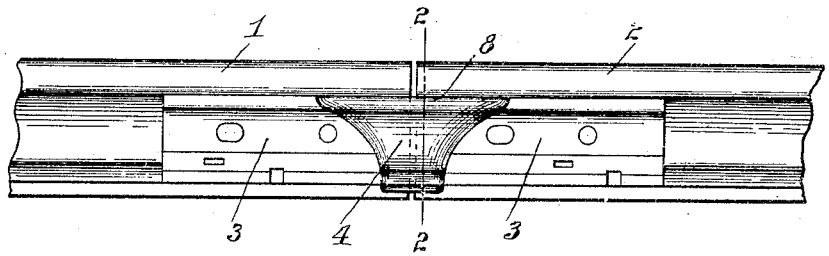
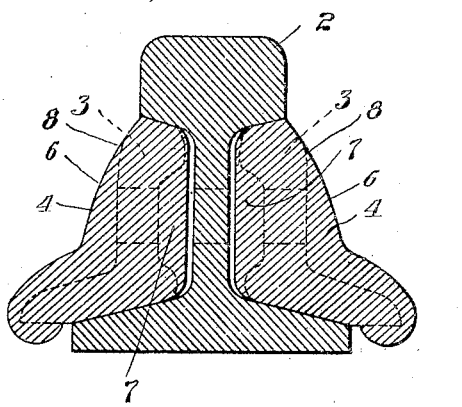
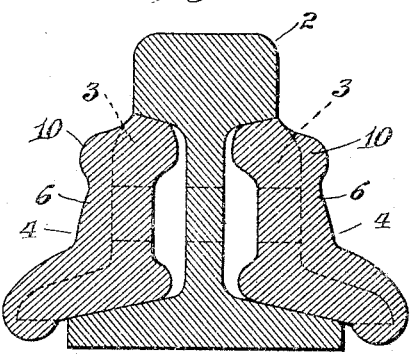
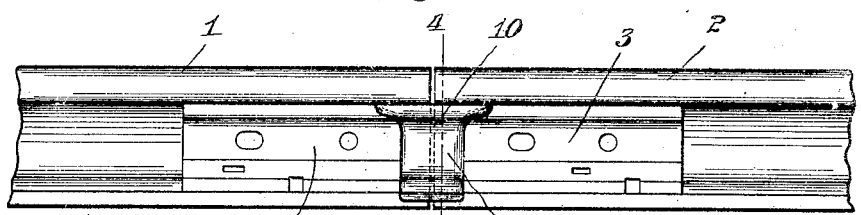
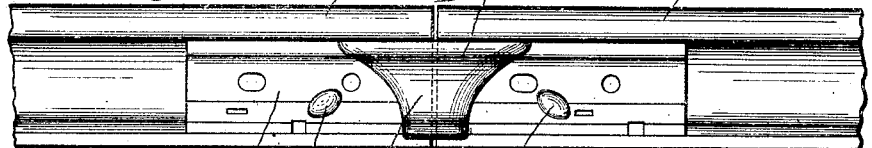
Attest:
Inventor:
Richard J. McComb
by
Atty.

UNITED STATES PATENT OFFICE.

RICHARD JOHNSON McCOMB, OF CHICAGO, ILLINOIS, ASSIGNOR TO Q & C COMPANY, OF NEW YORK, N. Y., A CORPORATION OF MAINE.

MANUFACTURE OF SPLICE-BARS FOR RAIL-JOINTS.

1,373,749.            Specification of Letters Patent.        Patented Apr. 5, 1921.

Application filed December 16, 1920. Serial No. 431,114.

*To all whom it may concern:*

Be it known that I, RICHARD JOHNSON MC-COMB, a citizen of the United States, residing at Chicago, in the county of Cook and State of Illinois, have invented new and useful Improvements in the Manufacture of Splice-Bars for Rail-Joints, of which the following is a specification.

This invention relates to improvements in the method of manufacturing splice bars for rail joints and an improved splice bar produced thereby which is materially strengthened immediately adjacent the point of joining of the rails. The improvements of my present invention have in view the economical production of splice bars having a materially increased cross sectional area immediately at the joint or rail ends so as to reinforce the splice bars at their central portions where they are subjected to the greatest stress. An important feature of my present invention contemplates the manufacture of splice bars having the improved feature of a reinforced central portion desirably from standard rolled splice bars by the addition thereto of reinforcing metal at its central portion or immediately adjacent the meeting rail ends where the bars are subjected to the greatest tensional strains.

My present invention contemplates the reinforcing of the splice bars at their aforesaid central portions by the addition thereto of metal by welding, the addition of metal being proportioned to and disposed to give the desired increased cross-sectional area and resulting reinforcement as desired. Preferably the reinforcing addition of metal is applied to extend over a substantial area of the bar at its central portion, the enlargement thereof longitudinally being substantially to the degree permitted and limited by the distance between the innermost bolt holes. The welding enlargement of the bar at its upper edge also desirably may be longitudinally extended or flared so as to provide additional reinforcement. The addition of the reinforcing metal to the standard rolled sections of splice bars as herein contemplated, as will be readily understood may be performed by the well known and usual welding processes such as the electric or oxy-acetylene processes as now in common use. By my improved process the standard form of rolled splice bars having a uniform or substantially uniform cross section throughout their length may be readily and economically reinforced at their central portions where increased strength is most desirable and in a manner and to a degree which it is not practical to obtain in the initial rolling of the bar. In the latter connection it will be understood that by my improved process it is possible to provide a substantial enlargement of the cross sectional area at the central portion of the bar both upon the inner and outer sides of the bar section.

The aforesaid and other features and advantages of my improved process and improved splice bars produced thereby will be more fully understood with reference to the following description and drawings wherein like reference characters are applied to the corresponding parts in the several views.

Figure 1 is a view in side elevation illustrating a typical embodiment of my invention wherein the splice bar is illustrated as applied to the meeting rail ends.

Fig. 2 is an enlarged central vertical cross sectional view taken on line 2—2 of Fig. 1.

Fig. 3 is a view similar to Fig. 1 illustrating a suitable modification of reinforcing addition to the bar.

Fig. 4 is a vertical central cross sectional view thereof on line 4, 4 of Fig. 3.

Fig. 5 is a view, similar to Fig. 1, illustrating a further desirable modification.

Referring to the drawings wherein rail joints are illustrated embodying my improved splice bars, 1 and 2 indicate the meeting rail ends to be joined and 3—3 designate the splice bars of my improved construction fitted to the fishing angles of the rails and adapted to provide the connecting joint therebetween. As illustrated the improved splice bars of my invention are provided at their central portions 4 with enlargements of their cross sectional areas for the purpose of providing additional strength immediately at the region of the meeting rail ends where the strains upon the bars are at the maximum. The enlargements of the cross section or additional metal is thus disposed so as to obtain the greatest benefits therefrom in the reinforcing of the splice bars whereby the resulting bars are materially stronger than the rolled bar sections as at present used.

As shown in Figs. 2 and 4 the normal section of the rolled splice bars is indicated with dotted lines to which the additional metal for reinforcing is applied to the outwardly directed surface at 6 and also to the inner surface of the bar at 7.

As will be appreciated the amount of additional metal added to the bar and the distribution thereof may be governed to obtain the degree of reinforcing desired. In Figs. 1 and 2 there is shown an approved cross section and disposition of the reinforcing enlargement wherein as indicated the connecting weld is arranged to extend over a substantial area of the splice bar both on the inner and outer faces of the rolled section and moreover is at its upper edge longitudinally flared or enlarged at 8 to provide for additional area of reinforcing immediately beneath the ends of the rail heads. In addition thereto the reinforcing weld as applied to the outer surface may be extended over and below the outer bottom edge of the standard section thereby to provide an increased beam depth immediately at the joint. The additional or reinforcing metal thus provided is welded to the bars desirably from a bar of steel of substantially similar composition to that of the standard or rolled section to which it is applied. The improved bars of my invention may further and desirably are heat treated after the reinforcing weld or enlargement has been added thereto which treatment may desirably consist of heating to about 1700° F., quenching in oil, reheating from 1200° to 1400° F., quenching in water, again reheating to about 1200° F. and allowing to cool slowly.

The enlargement of the reinforcing weld longitudinally of the splice bars, as will be noted, may be to any desired degree permitted and limited by the distance between the inner bolt heads and, as illustrated, in the forming of the weld the marginal surface thereof may desirably be tapered off substantially to merge with the surface of the standard bar section.

From the foregoing it will be seen that by my improved method of reinforcing the splice bars there is produced an improved bar which is materially strengthened immediately adjacent to the meeting ends of the connected rails and therefore at the point most desired and important in lending strength to the resulting rail joint. Moreover the splice bar of my present invention may be economically produced in the manner described and with a degree of reinforcing enlargement which it would be impractical to produce by the rolling method.

While I have described a desirable embodiment of the features of my invention it will be understood that modifications may be made therein without departing from the scope thereof as defined in the appended claims. It is therefore intended that all matter herein shall be interpreted as illustrative and not in a limiting sense.

As illustrative of a desirable modification I have shown in Figs. 3 and 4 an embodiment of my improvements wherein the reinforcing enlargement or weld 6 is applied to the outer surface only of the splice bar section and in addition is formed at its upper margin with a reinforcing outer head enlargement 10, the metal of which is positioned at substantially the maximum distance from the neutral axis whereby it is highly efficient in its reinforcing action.

In Fig. 5 I have illustrated a further modification of the distribution of the reinforcing metal or weld wherein as indicated, the upper marginal portion or head enlargement 10 of the reinforcing weld 4 is extended longitudinally over the innermost bolt hole, thereby to reinforce the bar where structurally weakened, by reason of the bolt aperture. In addition thereto I have illustrated small reinforcing additions of metal at 12—12 interposed between the bolt and spike holes to similarly reinforce the weakened region resulting therefrom.

Having described my invention I claim:—

1. The herein described method for producing reinforced splice bars for rail joints which consists in forming a reinforcing enlargement of the cross sectional area of a standard rolled splice bar by welding additional metal thereon, substantially as described.

2. The herein described method for producing reinforced splice bars for rail joints which consists in forming a reinforcing enlargement to a standard rolled splice bar section at the central portion thereof by welding thereto additional metal of substantially the same composition as that of the standard section, substantially as described.

3. The herein described method of reinforcing rolled splice bars for rail joints which consists in forming a reinforcing enlargement at the central or joint region by the welding of additional metal thereon, substantially as described.

4. The herein described method for producing centrally reinforced splice bars from standard rolled sections of substantially uniform cross sectional area which consists in welding additional metal to the central portion of the bar, said reinforcing weld being enlarged longitudinally to be of substantial area, substantially as described.

5. The herein described method of reinforcing rolled splice bars for rail joints which consists in forming a reinforcing enlargement at the central or joint region thereof by the welding of additional metal upon the side of the bar, substantially as described.

6. The herein described method of reinforcing rolled steel splice bars for rail joints which consists in forming a reinforcing enlargement at the central or joint region of a standard rolled section by welding additional metal upon the side surfaces thereof, substantially as described.

7. The herein described method of reinforcing rolled splice bars for rail joints which consists in forming a reinforcing enlargement at the central portion of a rolled bar by the welding of additional metal thereon and heat treating the completed bar.

8. The herein described method of reinforcing rolled splice bars for rail joints which consists in forming a reinforcing enlargement in the cross sectional area at the central portion of the bar by the welding of additional metal thereon and heat treating the completed bar, said heat treatment consisting of heating the bar to about 1700° F. quenching in oil, reheating from about 1200° to 1400° F. quenching in water, again reheating to about 1200° F. and allowing to cool slowly, substantially as described.

9. A splice bar for rail joints consisting of a standard rolled splice bar section having a reinforcing enlargement of its cross sectional area at its central portion formed by the welding thereon of additional metal, substantially as described.

10. A splice bar for rail joints consisting of a rolled splice bar section provided with a reinforcing enlargement at its central portion formed by the welding thereon of additional metal of substantially the same composition as that of the rolled section and said reinforcing weld being enlarged longitudinally over a substantial area, substantially as described.

11. A reinforcing bar for rail joints consisting of a rolled steel splice bar section provided with a centrally arranged reinforcing enlargement of its cross sectional area formed by the welding of additional metal to the oposite sides thereof.

12. A splice bar for rail joints consisting of a rolled splice bar section provided with a centrally arranged reinforcing enlargement formed by the welding of additional metal thereon to the side of the bar and said completed bar being heat treated, substantially as described.

13. A splice bar for rail joints consisting of a standard rolled steel splice bar section provided with a centrally arranged reinforcing enlargement formed by the welding of additional metal thereon, said reinforcing weld being of steel of substantially similar composition to that of the rolled section, substantially as described.

14. A splice bar for rail joints consisting of a standard rolled steel splice bar section provided with a centrally arranged reinforcing enlargement formed by the welding of additional metal thereon, said reinforcing weld being of steel of substantially similar composition to that of the rolled section and heat treating the completed bar.

15. A splice bar for rail joints composed of a rolled steel splice bar section formed with a reinforcing enlargement at its central portion adjacent to the meeting rail ends, said enlargement being formed by the welding of additional metal thereon and said enlargement being formed with an outwardly extended head enlargement at its upper marginal edge, substantially as described.

16. A splice bar for rail joints composed of a rolled steel splice bar section formed with a reinforcing enlargement at its central portion adjacent to the meeting rail ends, said enlargement being formed by the welding of additional metal thereon and said enlargement being formed with an outwardly extended head enlargement at its upper marginal edge and being extended below the bottom surface of the rolled section of the outer edge thereof, substantially as described.

In testimony whereof I have signed my name to this specification.

RICHARD JOHNSON McCOMB.

Witnesses:
 MILO M. CASE,
 LEWIS THOMAS.